United States Patent [19]

Shinohara

[11] Patent Number: 5,765,083
[45] Date of Patent: Jun. 9, 1998

[54] COLOR IMAGE FORMING APPARATUS WITH REDUCED POSITIONAL DEVIATION

[75] Inventor: Tadashi Shinohara, Tokyo, Japan

[73] Assignee: Ricoh Company, Ltd., Tokyo, Japan

[21] Appl. No.: 802,989

[22] Filed: Feb. 21, 1997

[30] Foreign Application Priority Data

Feb. 26, 1996 [JP] Japan ................... 8-061680

[51] Int. Cl.⁶ ............................................. G03G 15/01
[52] U.S. Cl. ............................. 399/301; 347/116; 399/49
[58] Field of Search ........................... 399/49, 72, 223, 399/298, 301; 347/116

[56] References Cited

U.S. PATENT DOCUMENTS

| | | | |
|---|---|---|---|
| 5,384,592 | 1/1995 | Wong | 347/116 |
| 5,499,092 | 3/1996 | Sasaki | 347/116 X |
| 5,627,649 | 5/1997 | Sawayama et al. | 347/116 X |

FOREIGN PATENT DOCUMENTS

| | | |
|---|---|---|
| 63-27175 | 11/1988 | Japan . |
| 63-292163 | 11/1988 | Japan . |
| 1-281468 | 11/1989 | Japan . |
| 4-149479 | 5/1992 | Japan . |
| 7-92763 | 4/1995 | Japan . |

*Primary Examiner*—Arthur T. Grimley
*Assistant Examiner*—Sophia S. Chen
*Attorney, Agent, or Firm*—Oblon, Spivak, McClelland, Maier & Neustadt, P.C.

[57] ABSTRACT

A registration mark formed on an intermediate transfer belt is detected by a mark sensor, and a mark detecting signal is sent to a counter section from the mark sensor. The counter section starts to count a clock signal from an oscillator when the mark detecting signal is sent. A corrector section checks a corrected information which indicates a property of a number of printed surfaces registered in a corrected information register section and a detecting time difference, by the number of the printed surfaces sent from a mark detecting counter, and sends corrected time information corresponding to the number of the printed surfaces. The counter section sends a corrected signal to an engine controller section when a counted value of the clock signal reaches the corrected time information, and controls the time of starting image reading.

19 Claims, 8 Drawing Sheets

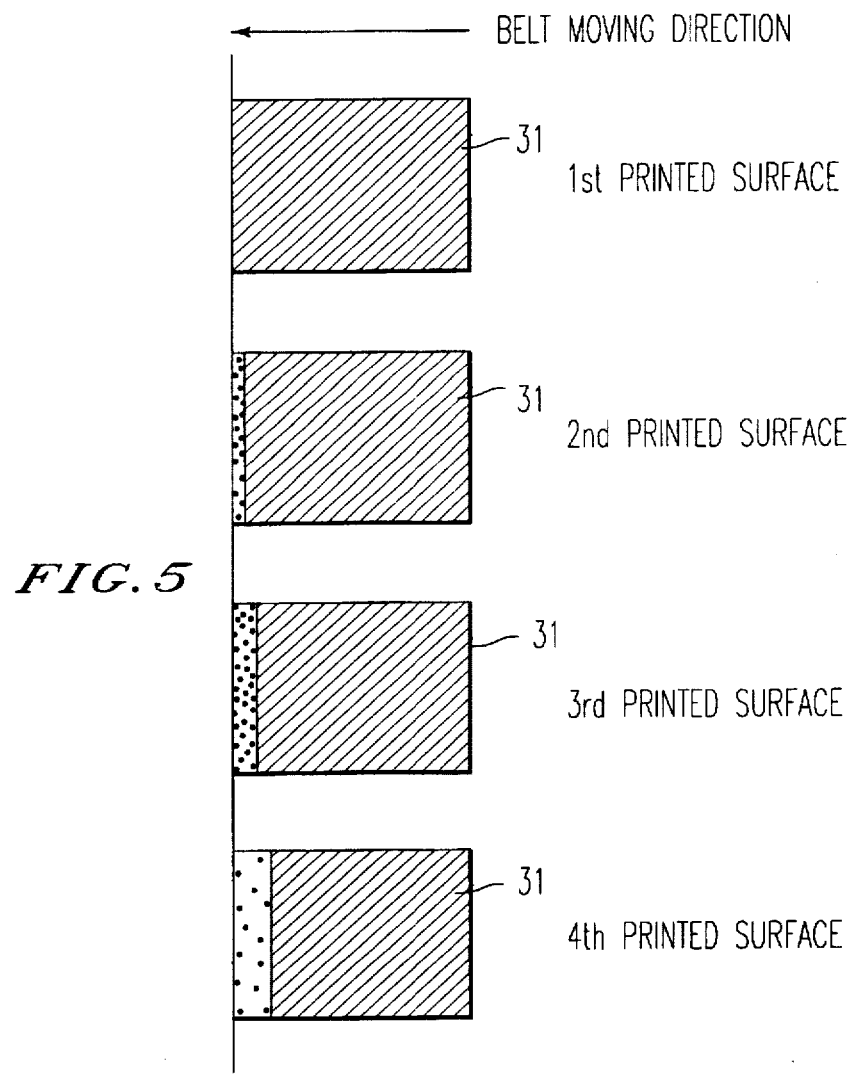
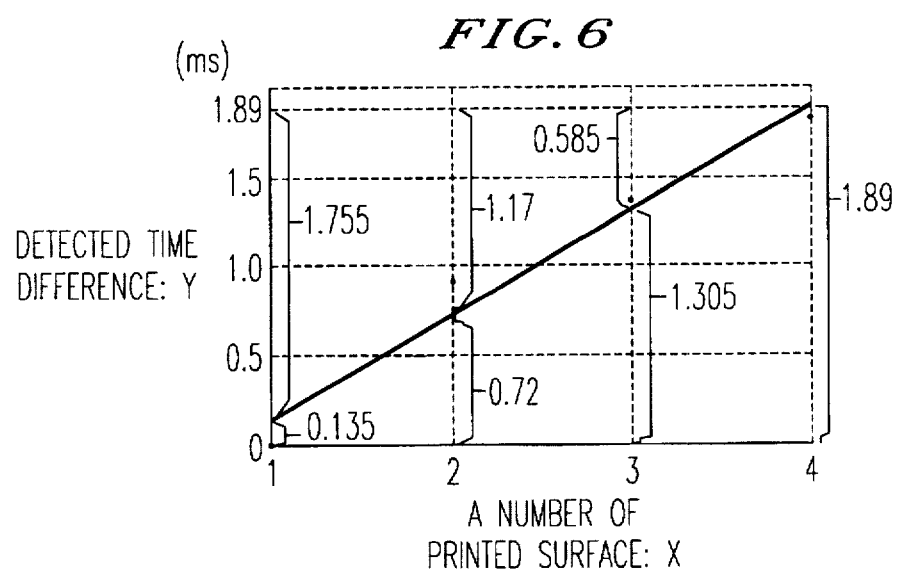

COLOR IMAGE FORMING APPARATUS WITH REDUCED POSITIONAL DEVIATION

BACKGROUND OF THE INVENTION

1. Field of the Invention

The present invention relates to a color image forming apparatus such as a copying machine, a printer, or a facsimile device of an electrophotographic or electrostatic image recording system, and in particular the present invention relates to a color image forming apparatus capable of preventing positional deviation of respective color images.

2. Discussion of the Background

In a color image forming apparatus of an electrophotographic system or an electrostatic recording system, a type is known which has a rotating development device disposed at a position close to a single photoconductive element in which development of each color of yellow, magenta, cyan and black is executed in order by rotating the development device, and an image is transferred on a transfer paper (hereinafter called paper) after images of the respective colors are superposed on an intermediate transfer belt, as shown in, for example, Japanese Laid-open Patent Publication No. 6-289685/1994. A type of color image forming apparatus is also known which transfers the images to a conveyed sheet by a transfer belt (conveying belt) in order, disposing the developing unit and photoconductive elements for each color along the transfer belt.

In these color image forming apparatuses, methods of preventing deviation of the formed color images have been proposed. One first such method includes starting an electrostatic latent image writing on the basis of a recognition signal of a registration mark formed on the intermediate transfer belt as shown in, for example, Japanese Laid-Open Patent Publication No. 6-289685/1994. Another such method includes correcting deviation between the images in a moving direction or a direction rectangular thereto of the transfer belt by detecting a recording position of each color image which is transferred on the transfer belt as shown in, for example, Japanese Laid-Open Patent Publication No. 63-271275.

To reduce the aforementioned deviation between the images of respective colors in the first method noted above, it is required to detect the registration mark for accurately determining the image forming position. However, forming the registration mark on the intermediate transfer belt or the transfer belt causes the phenomenon that the mark may be re-transferred back to the photoconductive element and the mark may expand towards a rear end direction of the image as a result of receiving a pressure at a contacting point of the photoconductive element during the image forming process for the four colors.

Therefore, with such a method some problems may arise, such as a faint light image density resulting, or a deviation of a tip end position of the images resulting, and consequently a detecting position of the registration mark which is optically detected differs from another mark in different printed surfaces, and therefore, a limitation arises in reducing the deviation between the images in such a method.

SUMMARY OF THE INVENTION

The present invention is made in light of the abovementioned shortcomings, and accordingly, it is an object of the present invention to provide a novel color image forming apparatus which is capable of forming color images with accurate registration by reducing a deviation between the images to the utmost, in spite of detecting positions of the registration marks being different between different printed surfaces.

It is another object of the present invention to provide a novel color image forming apparatus which detects a registration mark as positional information which is transferred onto a transfer belt for correcting a position of a detected registration mark in accordance with a fluctuation of a pre-measured detecting position of each of a number of printed surfaces.

It is still another object of the present invention to provide a novel color image forming apparatus which detects a position of a registration mark for determining image forming positions of respective colors which are transferred onto a transfer belt for correcting a detected positional signal in accordance with a fluctuation of a pre-measured detecting position of each of a number of printed surfaces for determining a starting position for forming images of respective colors.

It is still another object of the present invention to provide a novel color image forming apparatus in which a transfer bias voltage is applied to a transfer belt when a registration mark, as positional information, transferred thereto comes into contact with a photoconductive element and is put close to the photoconductive element.

It is still another object of the present invention to provide a novel color image forming apparatus which reforms a registration mark on a transfer belt in each printing operation of a color image.

It is still another object of the present invention to provide a novel color image forming apparatus which reforms a registration mark with plural kinds of toner for different colors when the registration mark is re-formed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is an explanatory diagram showing a positional deviation of the registration mark;

FIG. 6 is a property diagram showing a number of printed surfaces and a detecting time difference in each printed surface based on a first printed surface;

DESCRIPTION OF THE PREFERRED EMBODIMENTS

Figure 1:
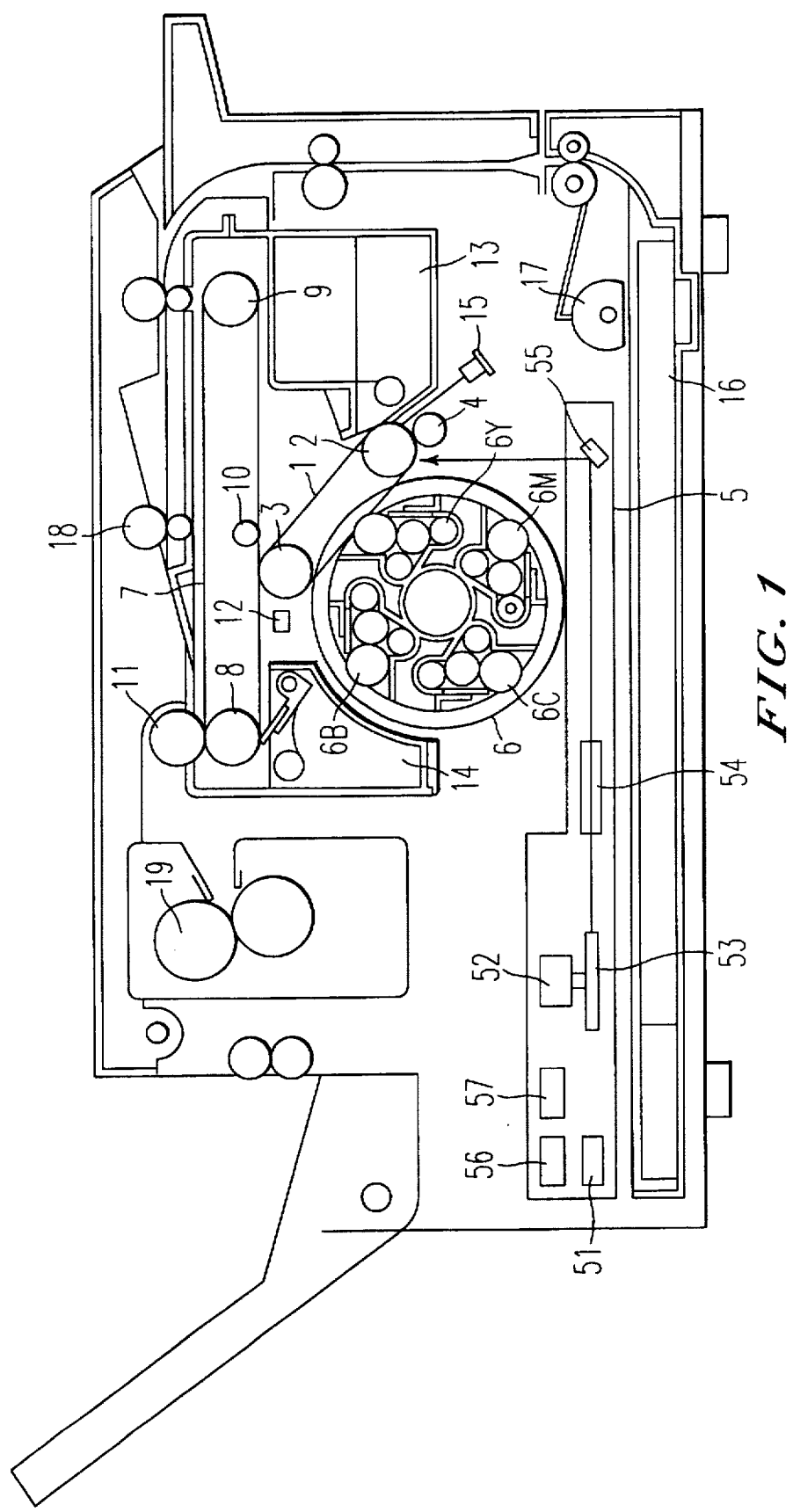
FIG. 1 is an illustrative diagram showing a construction of a color image forming apparatus of an embodiment according to the present invention.

FIG. 1 is an illustrative diagram showing a construction of a color image forming apparatus of an embodiment according to the present invention. As shown in FIG. 1, a flexible belt-like photoconductive element 1 employed as a belt-like image carrying element is movably positioned between rotatable rollers 2 and 3, and is conveyed clockwise by the action of a driving force of the rotatable rollers 2 and 3 in a color image forming apparatus. A charging device 4 for charging the belt-like photoconductive element 1 is disposed so as to face the rotatable roller 2, and a laser beam from a laser optical system 5, which is a laser writing unit employed as an image exposing device, is applied to the belt-like photoconductive element 1 at a downstream position from the charging device 4.

The laser optical system 5 is incorporated in a main body contained in a supporting case which has a slit-like exposure opening at an upper face thereof. A developing unit 6 is located at a downstream position from the applying position of the laser beam. A plurality of developing units 6Y, 6M, 6C and 6B respectively containing special colors, for example, yellow, magenta, cyan and black, are accommodated in the developing unit 6 and have respective developing sleeves which are placed closely to or in contact with the belt-like photoconductive element 1 at a predetermined position, and which visualize respective latent images on the belt-like photoconductive element 1 by utilizing a non-contact developing method or a contact developing method.

Figure 2:
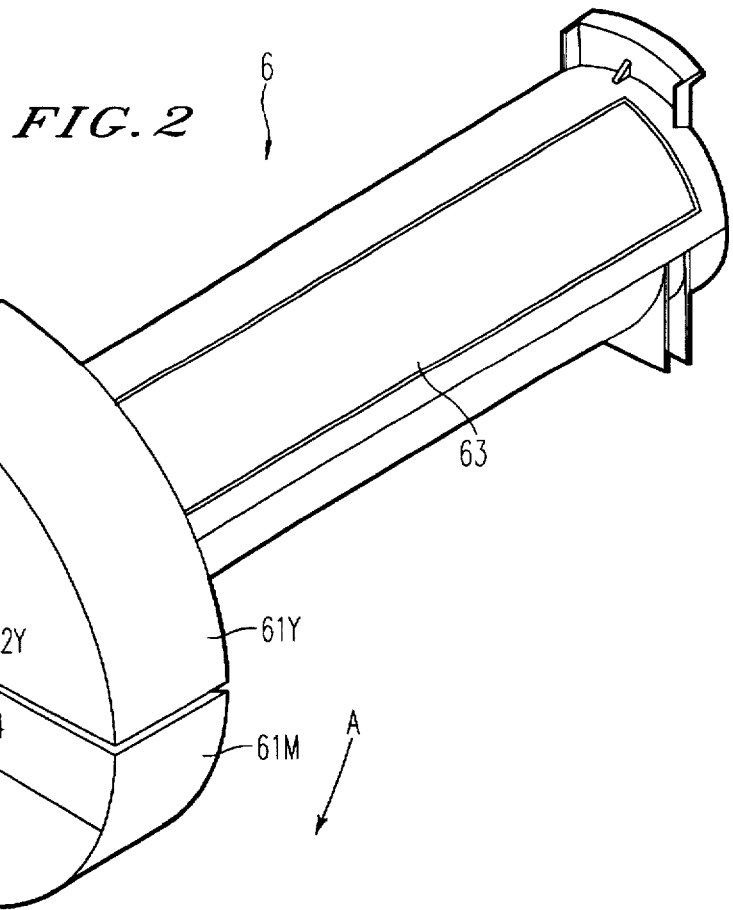
FIG. 2 is a perspective view showing a developing device of the above-mentioned embodiment.
Figure 3:
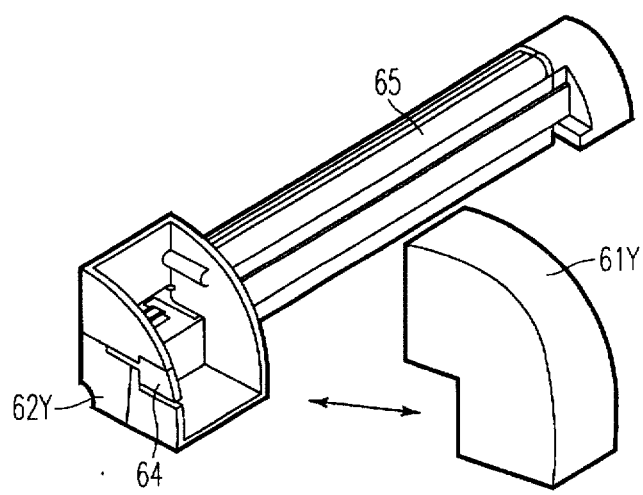
FIG. 3 is a perspective view showing an attaching/detaching operation of a toner cartridge of the developing device.

The developing units 6Y, 6M, 6C and 6B have cartridges 61Y, 61M, 61C and 61B, which respectively contain yellow, magenta, cyan and black toners and hoppers, 62Y, 62M, 62C and 62B, for storing yellow, magenta, cyan, and black toners respectively supplied from the cartridges, 61Y, 61M, 61C and 61B, as shown in a perspective view in FIG. 2. The developing units 6Y, 6M, 6C and 6B rotate in a direction indicated by an arrow A in a developing process, and stop at a position of each opening 63 so as to develop the latent image formed on the belt-like photoconductive element 1. Respective developing units 6Y, 6M, 6C and 6B can be exchanged after being detached from the developing unit 6 so as to resupply toner when any toner is consumed or the lifetime of any toner is finished. Especially, the cartridges 61Y, 61M, 61C and 61B can be easily exchanged by operating an attaching/detaching lever 64 when the cartridges are attached to or detached from the developing unit 6. Furthermore, element 65 in FIG. 3 is a developing roller.

An intermediate transfer belt 7 employed as a transferred image carrying element is movably positioned between rotatable rollers 8 and 9, and contacts the belt-like photoconductive element 1 at a position of rotatable roller 3 which supports the belt-like photoconductive element 1. This intermediate transfer belt 7 is conveyed counter-clockwise by the action of a driving force of the rotatable rollers 8 and 9. A bias roller 10 is located adjacent to a contact point of the belt-like photoconductive element 1 on the intermediate transfer belt 7.

A first visible image on the belt-like photoconductive element 1 is transferred onto the intermediate transfer belt 7 by the bias roller 10. Second, third and fourth visible images of the different colors are then transferred one above the other onto the intermediate transfer belt 7 by respectively repeating the same procedures. A full color image is then transferred onto a paper sheet by a transfer roller 11 which is attached to or detached from the intermediate transfer belt 7.

Furthermore, a mark sensor 12 for detecting a registration mark is disposed at a position upstream of the contact point of the belt-like photoconductive element 1 and the intermediate transfer belt 7, and faces a peripheral surface of the intermediate transfer belt 7. Furthermore, a cleaning unit 13 for removing remaining toner on the belt-like photoconductive element 1 and a cleaning unit 14 for removing remaining toner on the intermediate transfer belt 7 are also provided.

A color image forming process executed by the color image forming apparatus thus constructed is explained below. An image datum is generated by calculating a datum which is obtained by scanning an original document in a color image datum inputting section (not shown), in an image datum processing section (not shown), and which is then temporarily stored in an image memory. If the image datum is taken out from the image memory when an image is recorded and input to the laser optical system 5, a laser beam generated by a semiconductor laser device (e.g., a laser diode) 51 in the laser optical system 5 is rotatively-scanned by a polygon mirror 53, which is rotated by a drive motor 52, and its light path is turned by a mirror 55 after passing through an f-theta (θ) lens 54. The laser beam then forms a latent image by exposing a surface of the belt-like photoconductive element 1 which is discharged by a discharging lamp 15, and which is uniformly charged by the charging device 4. An image pattern exposed at this time is a mono-colored image pattern which is resolved from a required full color image into the individual monocolors yellow, magenta, cyan and black.

The formed latent images are developed into respective four color images, namely, yellow, magenta, cyan and black, by the respective developing units 6Y, 6M, 6C, 6B, and the mono-color images are thus formed. The mono-color images formed on the belt-like photoconductive element 1 are then transferred to the intermediate transfer belt 7, which rotates counter-clockwise, contacting the belt-like photoconductive element 1, and the mono-color images yellow, magenta, cyan and black which are formed on the belt-like photoconductive element are superposed in order on the intermediate transfer belt 7 one above the other. The image superposed on the intermediate transfer belt 7 is thereby a full color image which is then transferred onto the paper sheet which is conveyed from a paper feeding section 16 via a feeding roller 17 and a registration roller 18 to the transfer section, by a transfer roller 11. The image is then fixed at a fixing unit 19 after being transferred onto the paper sheet and to thereby form a full color image, and then the paper sheet is discharged.

Figure 4:
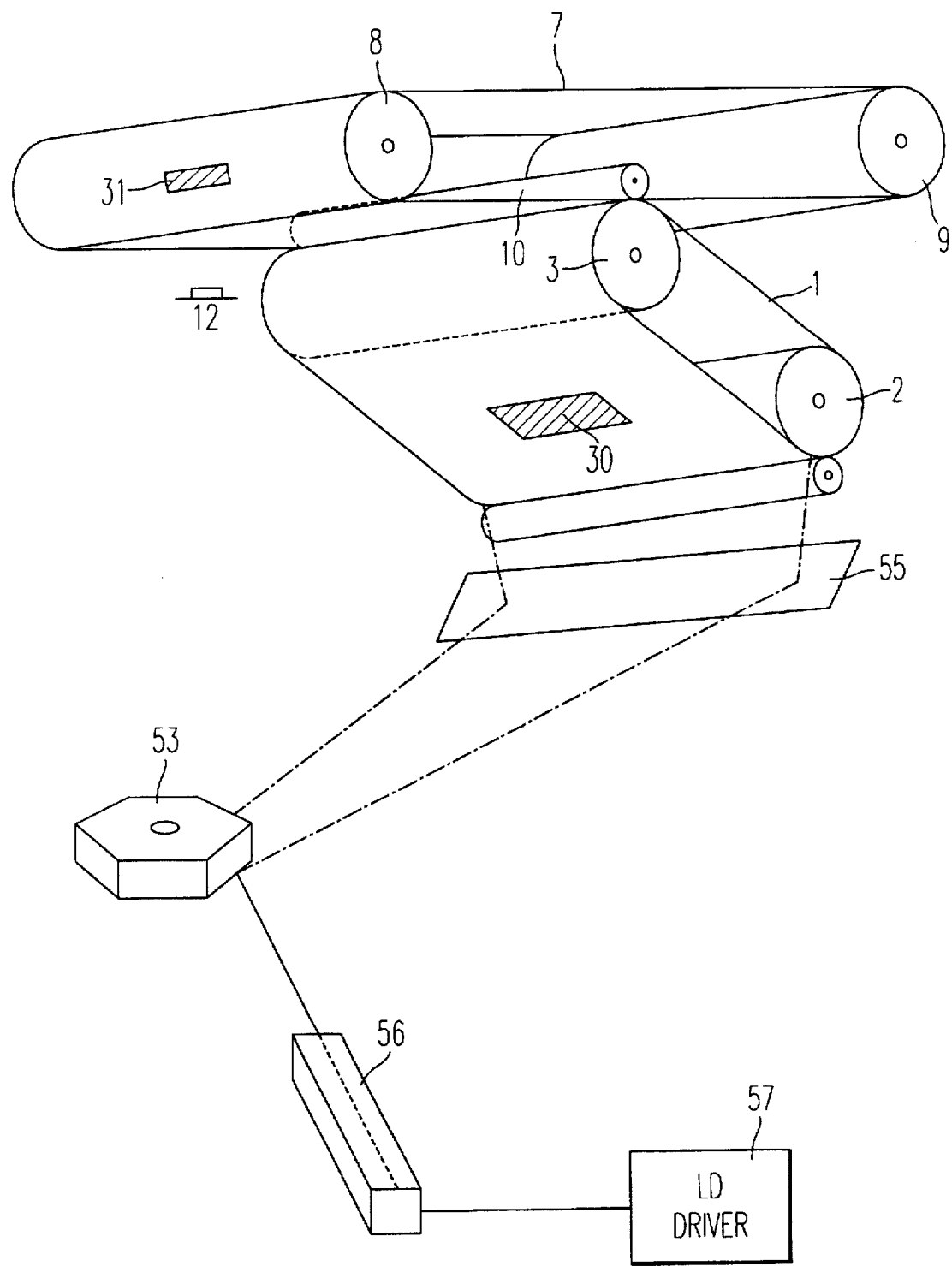
FIG. 4 is a perspective view showing an operation of forming a registration mark.

In such a manner as stated above, and with reference to FIG. 4, when the full color image is formed, a controller unit (hereinafter referred to as an LD unit) 56 of the laser optical system 5 is driven by a laser driver (hereinafter referred to as an LD driver) 57 of the laser optical system 5 in accordance with a datum of a registration mark image, to form a latent image of the registration mark 30 on the belt-like photoconductive element 1 via the polygon motor 53, the reflecting mirror 55 and the like, and forms a registration mark 31 by transferring a developed registration mark 30 to the intermediate transfer belt 7. The LD unit 56 writes an image on the belt-like photoconductive element 1 on the basis of the position of the registration mark 31 detected by the reflection type mark sensor 12, as shown in a perspective view in FIG. 4.

The image is written on the basis of the position of the registration mark 31 so as to prevent positional deviation between the mono-color images of yellow, magenta, cyan and black as mentioned above. However, the belt-like photoconductive element 1 and the intermediate transfer belt 7 contact each other at a transfer position where the bias roller 10 is located, and thereby, as shown in FIG. 5, the image density of the tip portion of the registration mark 31 may be brought into a state of becoming faint in color when a number of printed surfaces proceed by pressure of the contacting point, or toner may slightly move to a rear end portion of the mark 31. As a result, a position detected by the mark sensor 12 may fluctuate and a writing position may deviate from a correct position. Consequently, a positional deviation of the images may occur.

From an experiment of studying the positional fluctuation of the registration mark detected by the mark sensor 12 in each of the printed surfaces of respective colors, the below mentioned property diagram can be obtained. For example, a property diagram of the number of printed surfaces X and a detecting time difference Y in each of the printed surfaces based on the first printed surface as shown in FIG. 6 has been obtained by the inventors of the present application. It has been confirmed by the present inventors that there is approximately a proportional relationship between the number of the printed surfaces X and the detecting time difference Y in each of the printed surfaces based on the first printed surface. In this embodiment, an approximate calculation has been found by a linear approximation as shown below.

| | |
|---|---|
| $Y (ms) = 0.585X - 0.45$ | Y: detecting time difference<br>X: a number of printed surfaces |

Namely, when the number of the printed surfaces X=4, the detecting time difference Y=1.89, and the remainder obtained by subtracting the detecting time difference Y of each printed surface from Y=1.89 when X=4 is as follows:
first printed surface: 1.755 (ms)
second printed surface: 1.170 (ms)
third printed surface: 0.585 (ms).
That is, for forming images for accurate registration, forming the registration mark 31 with toner of a same color of the first printed surface, writing an image on the first printed surface is started 1.755 ms after detecting the registration mark 31 by the mark sensor 12, writing an image on the second printed surface is started 1.170 ms after detecting the registration mark 31, writing an image on the third printed surface is started 0.585 ms after detecting the registration mark 31, and writing an image on the fourth printed surface is started just at the time of detecting the registration mark 31. Thus, by executing such a time difference correction to the result of detecting the registration mark 31, each of the image writing start positions from the first printed surface to the fourth printed surface is properly aligned.

Figure 7:
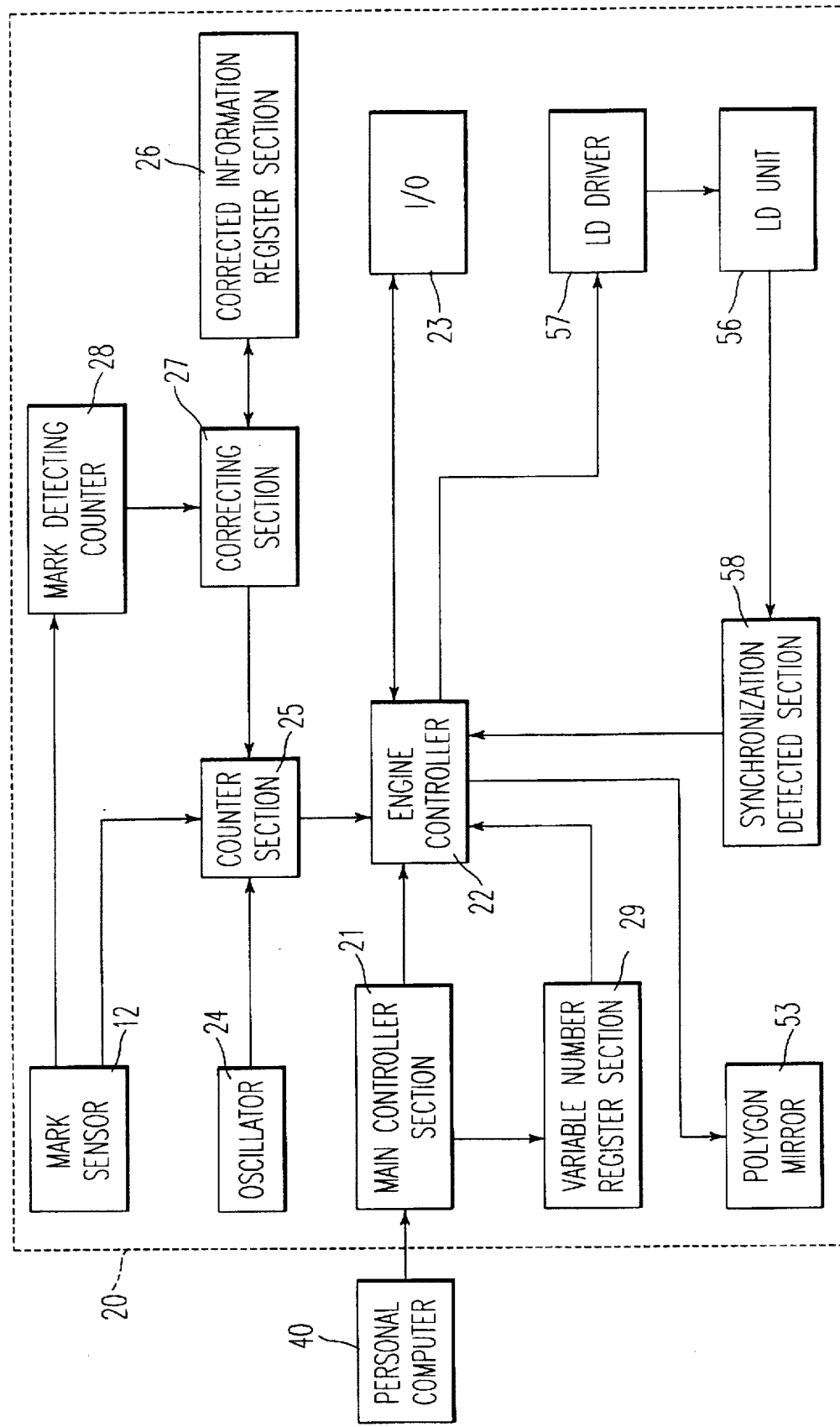
FIG. 7 is a block diagram showing a construction of an image reading controller part.

With reference to FIG. 7, an image reading controller 20 is provided with an oscillator 24, a counter section 25, a corrected information register section 26, a correcting section 27, a mark detecting counter 28, and a variable number register section 29, in addition to a main controller section 21 for controlling a reading operation and an engine controller section 22 which sends various kinds of control signals to the input/output section 23, and which controls rotation of the LD driver 57 and the polygon mirror 53 or the like by taking a transmitting timing of the image data by inputting a line synchronizing signal of LD unit 56 detected by synchronizing detector section 58.

The oscillator 24 generates a clock signal of, for example, 1 MHz. A property of the number of printed surfaces X and detecting the time difference Y in each of the number of printed surfaces which is based on the first printed surface is pre-measured and registered as a correcting information, for example in the correcting information register section 26 as shown in FIG. 6. The mark detecting counter 28 counts a number of detecting times of registration mark 31 which is detected by the mark sensor 12.

The correcting section 27 checks correcting information which is registered in the correcting information register section 26, corresponding to detecting times of the registration mark 31 counted by the mark detecting counter 28, that is, the number of the printed surfaces X, and sends a correcting value to the counter section 25 corresponding to the number of the printed surfaces X. When the detecting signal of the registration mark 31 is sent from the mark sensor 12, the counter section 25 counts a clock signal output from the oscillator 24, and when the counted value reaches the correcting value sent from the correcting section 27, the section 25 sends a correcting signal, on which the start timing of reading image information is based, to the engine section 22.

Figure 8:
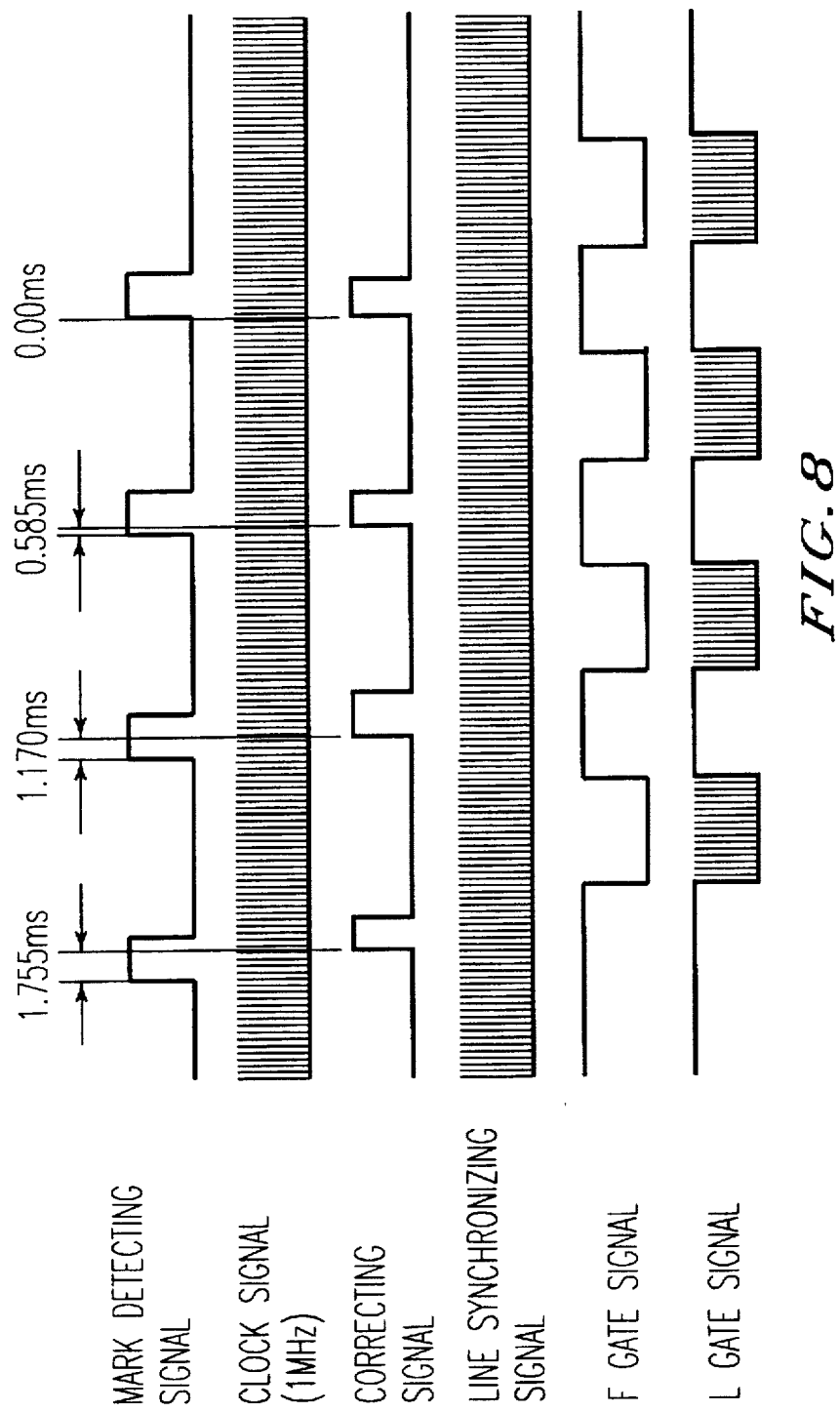
FIG. 8 is a timing chart showing an operation timing of image reading.

An operation of the image reading controller section 20 for reading out and superposing the mono-color images of yellow, magenta, cyan and black which are sent from, for example, a personal computer 40 to the main controller section 21 is now explained, referring to a timing chart in FIG. 8. When image reading starts, the registration mark 31 is formed on the intermediate transfer belt 7 at first, and the registration mark 31 is detected by the mark sensor 12. When the registration mark 31 formed on the intermediate transfer belt 7 is detected by the mark sensor 12, and the mark detecting signal is sent to the counter section 25, the counter section 25 starts to count the clock signal output from the oscillator 24.

On the other hand, after starting the image reading operation, the mark detecting counter 28 counts the mark detecting signal output from the mark sensor 12, and outputs a signal which indicates the number X of the printed surfaces to the correcting section 27. If the number of the printed surfaces X sent from the mark detecting counter 28 indicates the first printed surface, the correcting section 27 checks the correcting information registered in the correcting information register section 26, and if the correcting information indicates, for example, a correcting property as shown in FIG. 6 is registered in the correcting information register section 26, a value 1.755 ms is sent to the counter section 25 as a correcting value corresponding to the first printed surfaces X. If counting clock signal reaches the correcting value, i.e. 1.755 ms, the counter section 25 sends the correction signal to be used for indicating a starting operation to read the image information to the engine controller section 22. If the correction signal is sent, the engine controller section 22 limits a valid area for reading an image, by outputting an F gate signal which determines a valid image area of a main-scanning direction and an L gate signal which determines a valid image area of a sub-scanning direction on the basis of a line synchronizing signal sent from a synchronization detecting section 58.

This operation is repeated from the second printed surface to the fourth printed surface. If correcting information which indicates correcting, for example as shown in FIG. 6, is registered in the correcting information register section 26, the counter section 25 outputs a correcting signal 1.170 ms after detecting the registration mark 31 by the mark sensor 12 for the second printed surface, the counter section 25 outputs a correcting signal 0.585 ms after detecting the registration mark 31 by the mark sensor 12 for the third printed surface, and the counter section 25 does not output a correcting signal after detecting the registration mark 31 by the mark sensor 12 for the fourth printed surface.

In such a manner as stated above, even though a position of the registration mark 31 fluctuates in each of the printed surfaces of the images for the respective colors, the fluctuation can be corrected, and the positional deviation of each image on the printed surface can be prevented.

Furthermore, as a further feature, after forming the registration mark 31 on the intermediate transfer belt 7, the toner which forms the registration mark 31 is prevented from being re-transferred back onto the belt-like photoconductive element 1 by applying a transfer bias voltage to the intermediate transfer belt 7 by the bias roller 10 during the time period starting at the time point when the registration mark 31 is brought into contact with the belt-like photoconductive element 1 until the mark 31 departs from a position neighboring the photoconductive element 1.

Thus, the fluctuation of the registration mark detecting position is made minimal.

Moreover, because the registration mark 31 is formed on the intermediate transfer belt 7 in each image reading time, once per one full color image, the fluctuation of the registration mark detecting position is made minimal and the device of the present invention is capable of more accurate registration of the images.

Figure 9:
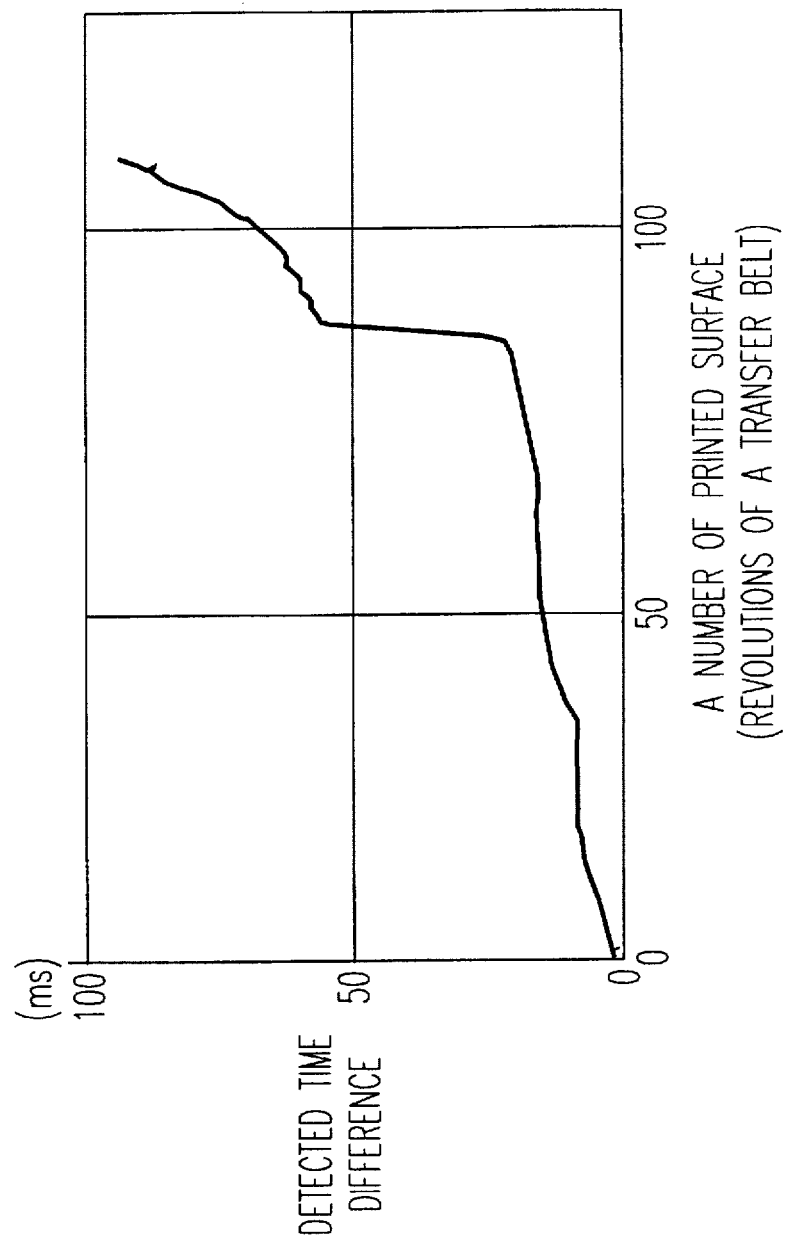
FIG. 9 is a property-variation diagram showing a relationship between a number of printed surfaces and a time difference of detecting the registration mark.

Results of experiments by the present inventors teach that if the registration mark 31 is used many times without re-forming, the detecting time difference suddenly increases when the number of the printed surfaces, that is, a number of revolutions of the intermediate transfer belt 7, reaches, for example, 88 revolutions, as shown in a property diagram of the number of the printed surfaces and the detecting time difference in FIG. 9. In a case as shown in FIG. 9, the detecting time difference suddenly changes at 88 revolutions of the intermediate transfer belt 7. However, the change of the detecting time difference may appear earlier. The accuracy of the alignment of the image position of the four colors becomes extremely aggravated if the detecting time difference suddenly changes as mentioned above. Therefore, the aforementioned phenomenon can be prevented by newly forming the registration mark 31 in each of four printed surfaces for transferring the four color images, namely, in printing each one full color image.

Furthermore, the aforementioned embodiment is explained in the case of forming the registration mark 31 on the intermediate transfer belt 7 with the toner of the first printed surface, for example, yellow toner. However, if the registration mark 31 is continuously formed only with the same color toner, consumption of the same color toner may increase, and only a frequency of exchanging the same color toner increases. Therefore, toner of a plurality of colors are preferably used one after another for forming the registration mark 31 on the intermediate transfer belt 7.

To state a more concrete example, the intermediate transfer belt 7 is black and is made of a material which does not reflect light. Therefore, the registration mark 31 is concretely formed of three colors, yellow, magenta and cyan. Usually, the registration mark 31 is formed of the developing unit 6Y of the position nearest to the opening 63 (home position) among the waiting developing units of respective colors 6Y, 6M, 6C and 6B as shown in FIG. 1, and then an image forming operation is started. Consequently, it is preferable to dispose each of the developing units on the home position in the order of 6Y, 6M, 6C, when each of the developing units 6Y, 6M, 6C and 6B is returned to the home position after finishing one job forming the four printed surfaces.

In such manner as stated above, an operation for changing a color of toner to form the registration mark 31 is explained, hereinafter, referring to the block diagram in FIG. 7.

At first, when the power is turned on, the main controller section 21 enters an initial setting routine and stores information of a color to be put at the home position in the variable number register section 29 as a variable number P so as to dispose one of the developing units at the home position, when various sorts of initial settings are executed. Usually, yellow Y is set for an initial setting value (information of a kind of color) as the variable number.

If a printing operation is requested from the personal computer 40 in this state, the engine controller section 22 starts a mark forming routine at first, and forms the registration mark 31 by the developing unit 6Y of yellow Y, which is predetermined by the variable number P in the variable number register section 29. Then, the engine controller section 22 starts an image reading process, and if one job for forming four printed surfaces has been finished, the main controller section 21 changes the present variable number P in the variable number register section 29 to magenta M. Then, if the engine controller section 22 starts the mark forming routine, the section 22 forms the registration mark 31 by the developing unit 6M of magenta M, which is predetermined by the variable number P in the variable number register section 29. The registration mark 31 is formed by repeating the operation in the order of yellow Y, magenta M and cyan C at each time for forming the full color images. Thus, each of the toners yellow Y, magenta M and cyan C can be almost uniformly consumed.

Figure 10:
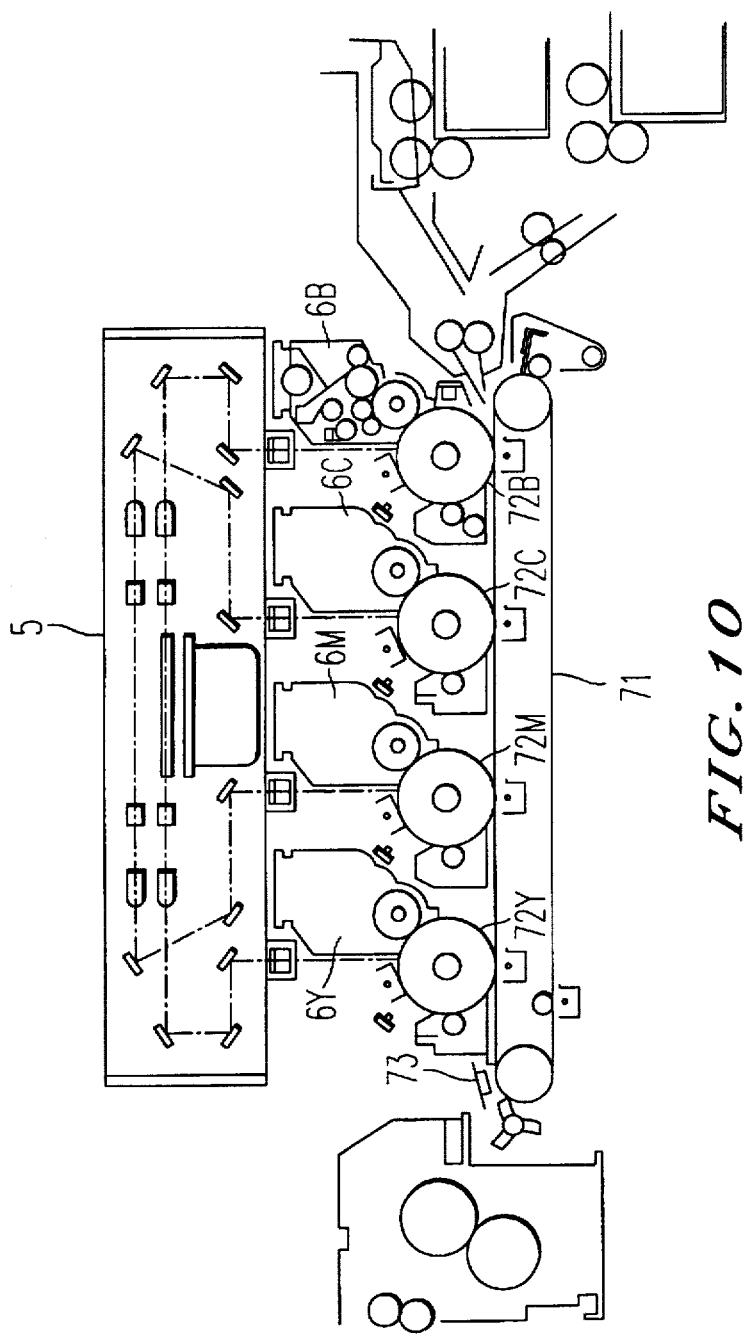
FIG. 10 is an illustrative drawing showing a construction of another color image forming apparatus of the present invention.

Furthermore, a color image forming apparatus provided with a rotating developing device is explained in the aforementioned embodiment. However, as shown in an illustrative drawing of the construction in FIG. 10, the present invention can also be applied to a tandem type image forming apparatus which prints a full color image on a paper conveyed by a transfer belt (transfer conveyer belt) 71, which is constructed with each of the developing units 6Y, 6M, 6C and 6B respectively for yellow Y, magenta M, cyan C and black B, and is also constructed with each of photoconductive elements 72Y, 72M, 72C and 72B for the respective colors, both disposed in tandem.

In such a tandem-type image forming apparatus, the fluctuation of the image positional deviation amount is caused by the change on standing due to the usage environment and/or thermal expansion. However, in order to correct the fluctuation of its positional deviation, a registration mark is formed on the transfer belt (transfer conveyer belt) 71, and is detected by a mark sensor 73. By correcting the detected result by pre-measured correcting information as in the case of the aforementioned embodiment, the positional deviation of the image which is formed by the developing units 6Y, 6M, 6C and 6B can be reduced.

Furthermore, in the above-mentioned embodiment, the present invention is featured in forming the registration mark 31 newly in printing each one full color image including four printed surfaces of transferring respective color images, as a best mode. However, the present invention is not limited to such a re-forming interval of the registration marks, and any revolution in each 88 or less may be allowed for the re-forming interval of the registration mark referring to FIG. 9. Still further, although the above-mentioned embodiment is explained with reference to a case of employing the intermediate transfer belt 7 as the intermediate transfer member, a drum-shaped intermediate transfer member may also be used.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A color image forming apparatus, comprising:
   a detector detecting a registration mark on a transfer member as a positional information;
   a memory storing pre-measured time delay difference correction data indicating a time extent of fluctuation of detected positions of detecting the registration mark for a plurality of successive printed surfaces on the transfer member; and
   a controller correcting the detected position of the registration mark for each of the plurality of successive printed surfaces based on corresponding stored pre-measured correction data.

2. The color image forming apparatus according to claim 1, further comprising:
   a photoconductive element which can be brought into contact with the registration mark on the transfer member; and
   a transfer bias source applying a transfer bias to the transfer member when the photoconductive element is brought into contact with the registration mark of the transfer member.

3. The color image forming apparatus according to claim 2, wherein the registration mark is periodically re-formed on the transfer member.

4. The color image forming apparatus according to claim 1, wherein the registration mark is periodically re-formed on the transfer member.

5. A color image forming apparatus, comprising:
   a detector detecting a registration mark on a transfer member as a positional information for determining an image forming position for transferring images of different respective colors onto the transfer member;
   a memory for storing pre-measured time delay difference correction data indicating a time extent of fluctuation of detected positions of detecting the registration mark for a plurality of successive printed surfaces on the transfer member; and
   a controller correcting the detected position of the registration mark for each of the plurality of successive printed surfaces based on corresponding stored pre-measured correction data to correct a start position for forming the images of the different respective colors on the transfer member.

6. The color image forming apparatus according to claim 5, further comprising:
   a photoconductive element which can be brought into contact with the registration mark on the transfer member; and
   a transfer bias source applying a transfer bias to the transfer member when the photoconductive element is brought into contact with the registration mark of the transfer member.

7. The color image forming apparatus according to claim 6, wherein the registration mark is periodically re-formed on the transfer member.

8. The color image forming apparatus according to claim 8 wherein the registration mark is re-formed on the transfer member after forming the images of the different respective colors on the transfer member to form a full color image.

9. The color image forming apparatus according to claim 5, wherein the registration mark is periodically re-formed on the transfer member.

10. The color image forming apparatus according to claim 9, wherein the registration mark is re-formed on the transfer member after forming the images of the different respective colors on the transfer member to form a full color image.

11. The color image forming apparatus according to claim 5, further comprising:
    a photoconductive means for forming an image thereon and for being brought into contact with the registration mark on the transfer member; and
    transfer bias means for applying a transfer bias to the transfer member when the photoconductive means is brought into contact with the registration mark of the transfer member.

12. The color image forming apparatus according to claim 11, wherein the registration mark is periodically re-formed on the transfer member.

13. The color image forming apparatus according to claim 5, wherein the registration mark is periodically re-formed on the transfer member.

14. The color image forming apparatus according to claim 13, wherein the registration mark is re-formed on the transfer member after forming the images of the different respective colors on the transfer member to form a full color image.

15. A color image forming apparatus, comprising:
    detecting means for detecting a registration mark on a transfer member as a positional information;
    storing means for storing pre-measured time delay difference correction data indicating a time extent of fluctuation of the detected positions of detecting the registration mark for a plurality of successive printed surfaces on the transfer member; and
    control means for correcting the detected position of the registration mark for each of the printed plurality of successive surfaces printed surfaces based on corresponding stored pre-measured correction data.

16. The color image forming apparatus according to claim 15, further comprising:
    a photoconductive means for forming an image thereon and for being brought into contact with the registration mark on the transfer member; and
    transfer bias means for applying a transfer bias to the transfer member when the photoconductive means is brought into contact with the registration mark of the transfer member.

17. The color image forming apparatus according to claim 16, wherein the registration mark is periodically re-formed on the transfer member.

18. The color image forming apparatus according to claim 15, wherein the registration mark is periodically re-formed on the transfer member.

19. A color image forming apparatus, comprising:
    detecting means for detecting a registration mark on a transfer member as a positional information for determining an image forming position for transferring images of different respective colors onto the transfer member;
    storing means for storing pre-measured time delay difference correction data indicating a time extent of fluctuation of detected positions of detecting the registration mark for a plurality of successive printed surfaces on the transfer member; and control means for correcting the detected position of the registration mark for each of the plurality of successive printed surfaces based on corresponding stored pre-measured correction data to correct a start position for forming the images of the different respective colors on the transfer member.

* * * * *